United States Patent [19]

Schuessler

[11] Patent Number: 4,626,871

[45] Date of Patent: Dec. 2, 1986

[54] THERMAL PRINT HEAD WEAR BAR

[75] Inventor: Richard C. Schuessler, Levittown, Pa.

[73] Assignee: Gulton Industries, Inc., East Greenwich, R.I.

[21] Appl. No.: 699,901

[22] Filed: Feb. 8, 1985

[51] Int. Cl.⁴ .............................................. G01D 15/10

[52] U.S. Cl. ................................ 346/76 PH; 219/543; 400/120

[58] Field of Search ........................ 346/76 PH, 134 R; 219/216 PH, 543, 54; 338/308, 309; 400/120; 428/908.8

[56] References Cited

U.S. PATENT DOCUMENTS

| | | | |
|---|---|---|---|
| 3,609,294 | 9/1971 | Cady, Jr. | 219/543 |
| 4,203,025 | 5/1980 | Natatani | 346/76 PH |
| 4,236,163 | 11/1980 | Iino | 346/139 C |
| 4,259,564 | 3/1981 | Ohkubo et al. | 346/76 PH |
| 4,401,881 | 8/1983 | Saito | 219/543 |

*Primary Examiner*—Arthur G. Evans

*Attorney, Agent, or Firm*—Darby & Darby

[57] ABSTRACT

A thermal print head for use in thermal printing apparatus has a pattern of conductive lines for energizing a resistive member overlying a portion of the lines to generate discrete heated spots on the resistive member. A screen-printed protective coating over a portion of the pattern is adapted to reduce the abrasive effect of grit particles carried on the medium to be printed. The coating comprises a layer of dried and fired material formed of a ceramic/glass overglaze composition mixed with fine metallic oxide particles.

13 Claims, 3 Drawing Figures

THERMAL PRINT HEAD WEAR BAR

This invention relates to thermal print heads. In particular, the invention relates to a thermal print head having a wear bar for improved resistance for the print head against abrasive deterioration due to direct contact of the thermal print head with heat sensitive paper.

Thermal printing is a highly reliable method for accomplishing high speed, high resolution printing tasks. Heat sensitive paper, tape, or other thermal medium, is placed in contact with a heating element; when the heating element is electrically energized, the transmitted heat causes a mark to appear on the paper, at the location of the heating element and in the shape of that heating element. A row of heating elements can thus simultaneously print a complete row of marks, such as dots, for example. If the heat sensitive paper is moved along a row of dot-shaped heating elements at a predetermined speed, the heating elements can be energized and de-energized in such a fashion in timed correspondence with the paper movement so that recognizable patterns of dots are formed on the paper. These patterns may be letter characters, numbers, designs, or virtually any desired image. The part of thermal printing apparatus which produces the heated areas is known as a thermal print head.

The thermal print head comprises a row of discrete heating elements mounted on a substrate or base, with controlling circuitry for determining operation of the individual heating elements, means for attaching the print head to the rest of the thermal printing apparatus, and electrical interconnection means for providing the control circuitry and heating elements with power, ground connection, and data signals.

Screen printing methods and apparatus are commonly used to place circuitry such as conductive lines on a substrate. Screen printing is especially well suited to the preparation and placement of discrete layers of different materials on the thermal print head substrate and thermal print heads are commonly manufactured in this way.

In one particular type of print head, the individual heating elements are formed by adjacent contiguous sections of a continuous resistor bar, customarily known as an R-bar. Directly underneath the R-bar are interleaved conductive fingers, with every other finger being a ground finger. All of the ground fingers are connected together by a common ground conductor line adjacent to and extending along the length of the R-bar. Interleaved between each pair of ground fingers is a signal finger, connected by conductive lines printed on the surface of the print head substrate or base material to the controlling circuitry, located away from the R-bar, to avoid interfering with having the moving heat-sensitive paper contact the R-bar. As the desired print resolution increases, the conductive lines connecting the signal fingers to their associated controlling circuitry become more densely packed and more delicate. Thus, for high-resolution thermal printers, much of the delicate conductive line array is exposed to possible abrasive contact with the moving heat-sensitive paper as the paper is brought into contact with the R-bar located nearby. Such abrasion would cause rubbing away or other damage to the printed conductive lines, and thereby reduce the useful life of the print head.

One previously proposed solution to this problem of abrasive deterioration of conductive lines near the R-bar was to use a smooth clear dielectric glass coating over the conductive lines. This coating was screen-printed over the conductive lines in the form of a slurry (called an "ink") of finely comminuted glass particles in an appropriate liquid medium, one commercially available product being duPont #9615. The use of this coating is well known. After printing, the print head was subjected to heat sufficient to fuse the glass particles to provide an extremely hard, smooth protective coating over the conductive lines. While this coating provided some improvement, and performed adequately in certain clean environments, its effectiveness was seen to vary with the cleanliness of the environment in which the thermal printing apparatus was used, and, in particular, with the characteristics of the atmospheric dust or dirt particles in that environment. In one especially harsh environment, such dust included silicon and carbon grit, which had deleterious effects on print head life. Not only would rubbing by the heat-sensitive medium cause abrasion, but it is believed that such grit falling on the medium would create greatly increased abrasion, resulting in wearing away the protective coating and finally exposing the conductive lines printed under the coating, which would be subject to damage.

In view of the above, an arrangement which could prevent abrasion of the conductive lines by abrasive particles, such as silicon and carbon grit, would greatly improve the durability of thermal print heads. An arrangement which could reduce, trap, or eliminate the abrasive particles would also improve the lifespan of the R-bar itself. Such an arrangement, if suitable for application by customary screen printing, would simply and inexpensively increase the normal expected life of a thermal print head.

Broadly, it is an object of this invention to improve the durability of thermal print heads. Specifically, an object of this invention is to provide a thermal print head having a wear bar for preventing abrasive deterioration due to the presence of abrasive particles, such as carbon and silicon grit, the wear bar being adapted to be placed on the print head by ordinary screen printing.

Another object of the invention is to provide a screenable composition for producing a protective wear bar on exposed circuitry, generally.

Another object of the invention is to provide a thermal print head having a significantly improved expected lifespan, the improvement being both inexpensive and easily achieved.

In accordance with an illustrative embodiment of the invention, a wear bar is formed over the conductive lines of a thermal print head, in the immediate vicinity of the R-bar. The wear bar is produced by customary screen printing apparatus and techniques. The "ink" used in screen printing the wear bar is a mixture of a commercially available ceramic/glass overglaze composition, and metal oxide particles.

The foregoing brief description, as well as further objects, features and advantages of this invention will be more completely understood from the following detailed description of a preferred, but nonetheless illustrative, embodiment of the invention, taken together with the accompanying drawings, in which.

Figure 1:
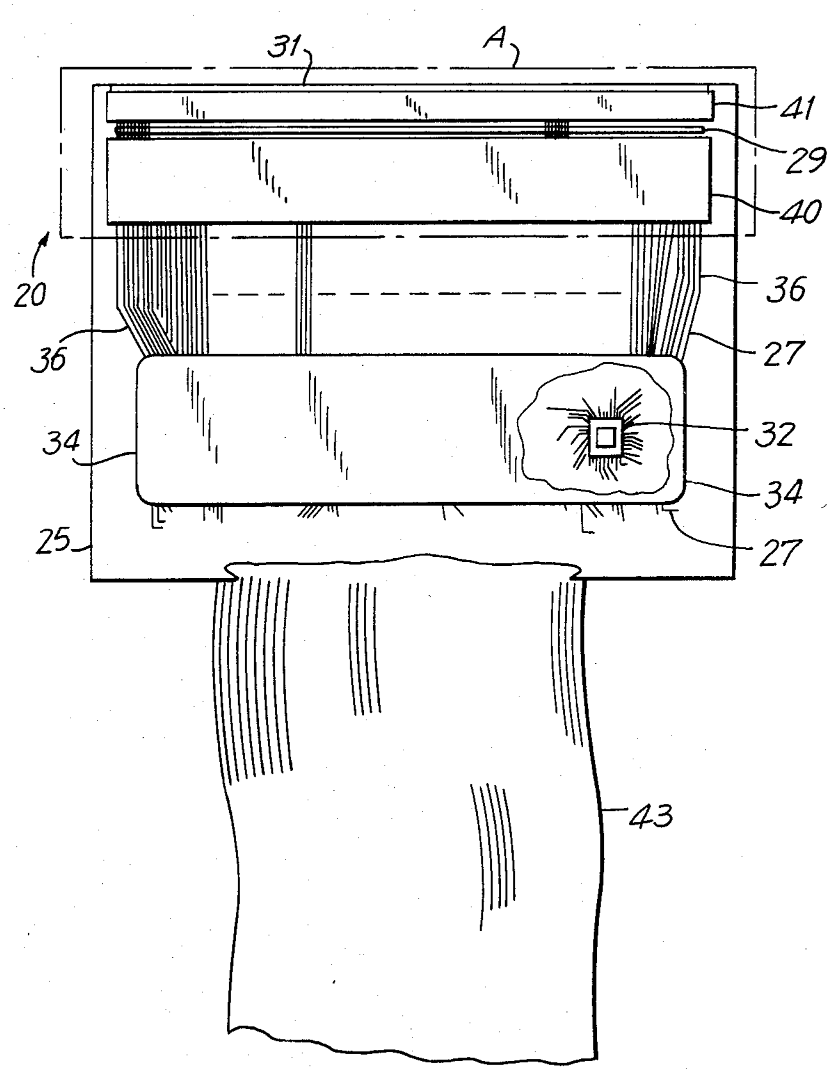
FIG. 1 is a plan view of a thermal print head according to the present invention, viewing the face against which passes the thermal responsive indicia-receiving medium.
Figure 3:
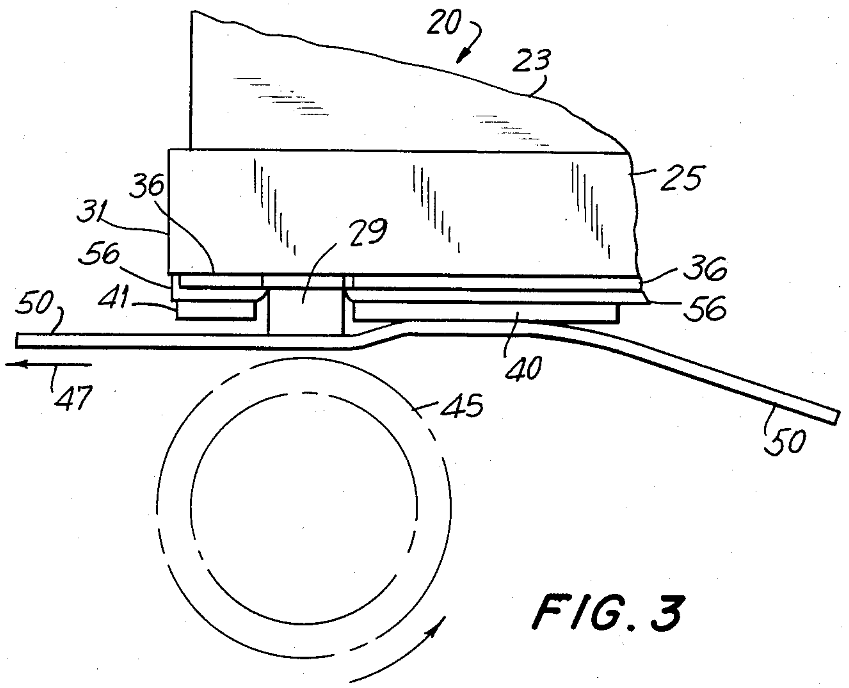
FIG. 3 is a side view of the thermal print head of FIG. 1 showing its relation to the imprint-receiving medium.

Referring now to FIG. 1, there is shown a thermal print head 20 according to the present invention, viewed from the working side along which the imprint-receiving medium passes (being the underside shown in FIG. 3). The various components and circuitry are mounted, screen printed, or otherwise placed on a substrate 25, which may be a glass composition printed circuit board, a ceramic sheet or block, a semiconductor material, or the like. This particular embodiment of the invention described here utilizes a ceramic substrate.

A series of hybrid chip microcircuits 32 are placed or formed on substrate 25. Conductive lines 27 screen printed onto the substrate 25 serve to connect circuits 32 to power sources and to excite the R-bar. These lines 27 may be printed in several discrete layers (not shown) with a layer of insulating ceramic material printed between layers of lines. The conductive lines 27 form the circuitry of the print head 20. All exposed circuitry of the print head is coated with a clear dielectric glass coating (not shown). A resistor bar or R-bar 29 is placed, as by screen printing, near an edge 31 of the print head 20. The R-bar 29 is controlled by the microcircuits 32. Individual segments of the R-bar 29 are energized by the hybrid chip microcircuits 32 via a series of parallel, closely spaced conductive lines 36 forming extensions of lines 27, in an array extending substantially across the width of the print head 20 (only several being shown, for illustrative purposes). Power, ground connection, and data signals are supplied to the print head 20 via a flexible multiconductor cable 43 to certain lines 27 leading to the microcircuits 32. Circuits 32 and adjoining portions of lines 27 are sealed under a smooth, hard protective shell 34.

A wear bar 40 according to the present invention, described in more detail below, covers and protects the conductive lines 36 near the R-bar 29 being placed directly onto the clear dielectric glass coating. A supplemental wear bar 41 is placed on the other side of the R-bar 29, between the R-bar 29 and the edge 31 of the print head 20, and likewise is placed onto the clear glass coating.

Figure 2:
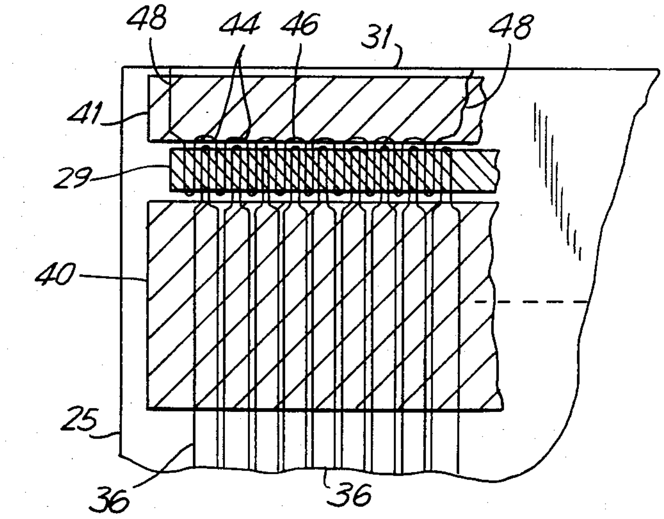
FIG. 2 is a greatly magnified partial view of a portion of Region A shown in FIG. 1.

FIG. 2 is an enlarged view of a portion of the area marked "A" in FIG. 1, showing in more detail the structure of the print head. The conductive lines 36 terminate at individual narrower signal fingers 46. Interleaved between the signal fingers 46 are ground fingers 44, connected electrically together by a common ground strip 48 located along the edge 31 of the substrate 25. The continuous R-bar 29 is located overlying the fingers 44,46 so that each finger, whether a signal finger 46 or a ground finger 44, extends fully from one side of the R-bar 29, underneath it and beyond it to the other side of the R-bar 29. When a signal finger 46 is energized, a segment of the R-bar 29, between the ground fingers 44 adjacent to that energized signal finger, is caused to transmit heat by current flow between the signal finger and its adjacent ground fingers. The transmitted heat causes a corresponding mark to appear on the thermal medium in contact with the R-bar, as described below.

The wear bar 40 according to the invention, is located in very close proximity to the R-bar 29, covering as much of the conductive lines 36 adjacent R-bar 29 as is possible. Likewise, supplemental wear bar 41 is located so as to protect the common ground bar 48 from abrasive contact with the moving heat-sensitive paper during the printing operation.

FIG. 3 illustrates the principle of thermal printing. A web or tape of heat sensitive paper 50 is drawn past the edge 31 of the thermal print head 20. The print head substrate 25 is here shown attached to a mounting piece 23 for attaching the print head 20 to thermal printing apparatus. The thermal paper 50 is brought into contact with the R-bar 29 in any customary manner, such as by passing the paper 50 between a roller 45 and the print head 20. Similarly, the travel direction shown at 47 is illustrative only, and may be reversed in particular thermal printers. In order for the thermal paper 50 to make contact with the R-bar 29, the height of the R-bar 29 above the substrate must exceed the height of both the wear bar 40 and the supplemental wear bar 41, as shown. The height of protective shell 34 of FIG. 1 exceeds the height of the R-bar 29; thus, it is necessary that the hybrid chip microcircuits 32 underneath the shell 34 be removed sufficiently away from the R-bar 29 so as to permit the illustrated contact between R-bar 29 and the thermal paper 50. In this particular embodiment, the microcircuits 32 are placed well away from even the wear bar 40, and are not shown in FIG. 3.

The means used to bring the thermal paper 50 into contact with the R-bar 29 also generally causes the paper 50 to come into contact with the print head at other areas near the R-bar 29. When sufficiently worn from this abrasive contact, the conductive lines cease to provide sufficient conductivity for an energizing signal to actually heat the corresponding segment of R-bar, and thus, no dot is printed. Abrasive particles also cause the R-bar itself to wear down.

When thermal printers were first developed, thermal print heads suffered such abrasion failures after only relatively short periods in service. After investigation, a solution was thought to reside in the use of a hard abrasion-resisting coating over the conductive lines. Accordingly, the entire exposed surface of the head except the R-bar 29 was coated with a glass dielectric material, such as duPont #9615, by screen printing and fusing. However, while this expedient provided adequate improvement in certain clean environments, print heads continued to fail in other environments.

While the reason for that failure is not fully known, it is believed that a significant factor in causing reduced operating life is grit and other contamination in air, which settle upon the heat-sensitive paper or tape, and cause abrasion not only of the R-bar 29 but also the previously used adjacent glass coatings to expose and erode the conductive lines underneath that coating.

According to the present invention, by use of a special material for the wear bars 40,41 located as described, the areas of the conductive lines 36 and of the conductive lines between the R-bar 29 and the edge 31 most likely to come into contact with the thermal medium during thermal printing are protected from contact with abrasive particles.

It is believed that the material employed serves to dislodge contaminating particles from the moving paper tape before they can abrade through to the conductive lines 36, or else the material in some way absorbs or occludes the abrasive particles on the thermal medium to reduce their abrading effect. It is also believed that the material prevents abrasive particles from reaching the R-bar, thus improving durability of the R-bar.

The material employed for wear bars 40,41 is a modification of a conventional ceramic/glass overglaze material, having a fusing temperature below that of the previous hard glass coating, so as to be able to be screened over the glass coating and fired without injuring the previous coating or underlying conductor lines or R-bar. To the conventional ceramic/glass overglaze material (exemplified by REMEX Overglaze Composition 7507, available from Remex Corporation, Feasterville, PA 19047) is added from 5% to 15% of zirconia (zirconium oxide, $ZiO_2$) by weight and 10% to 0% of aluminum (aluminum oxide, $AlO_2$) for a total of 5 to 15% of oxides of these metals. A preferred composition is a mixture of approximately 90% by weight of REMEX overglaze composition with approximately 5% by weight of zirconia and approximtely 5% by weight of alumina. Particle size of the metal oxides ranges from 0.5 to 2.0 microns with a preferred size of about 1 micron. This ceramic/glass composition, in accordance with the present invention, is now commercially available as REMEX OVERGLAZE COMPOSITION 7597 GREEN. Although it has been believed that the addition of impurities to such overglaze compositions detrimentally affects the handling and performance characteristics of overglaze compositions, it has been found, surprisingly, that in the present instance such characteristics have not been impaired in any essential respect.

The ceramic/glass overglaze mixture according to the invention may be applied as a screening ink to a print head by using screen printing apparatus and techniques, which are well known in the art. For this particular illustrative embodiment, a 325-mesh thick-film pattern screen may be used on a C. W. Price Model 212 thick film screener. The screening ink is thinned with pine oil until its viscosity is approximately 5000 centipoise at 70° F. The ink is screened to achieve a fired thickness of 0.0005" to 0.0007", in this illustrative embodiment. The wear bars may be screened to any dimensions and thickness, so long as the fired wear bar does not interfere with the R-bar to paper contact. The print head may be fired in a thick-film firing furnace, e.g. Watkins-Johnson model 12CA, at a peak temperature of 600° C. for ten minutes. Standard and well-known firing temperature profiles are used.

The resulting wear bar has an almost opaque, semi-matte, green appearance. Referring back to FIG. 3, the side view of the finished print head illustrates the discrete layers of different materials. In this diagram, a conductive line 36 rests on the print head substrate 25. The clear glass dielectric material 56 has been applied over the conductive lines 36. Finally, the wear bars 40,41 are applied over the clear glass layer 56.

Despite the addition of metal oxide particles to the overglaze composition, the clear glass layer 56 is still harder than the wear bar 58. Surprisingly, a marked improvement in print head life is nonetheless achieved. Upon analyzing why the wear bar of the present invention dramatically improves print head life, it is believed that roughness, rather than hardness, is the desired feature of the protective coating. As noted before, the clear glass layer is very smooth. The wear bar of the invention, however, possesses microscopic surface roughness due to the impregnated metal oxide particles. These particles are believed to act to catch or dislodge abrasive particles (such as silicon or carbon grit) which may be embedded in or deposited on the thermal media, as from the atmosphere.

Application of the ceramic/glass overglaze mixture, as a screening ink, to the thermal print head requires only one additional screening, drying and firing operation. Since manufacture of a print head generally involves many such operations, and since the ink used to screen the wear bar is relatively inexpensive, the improved durability of the thermal print head is simply and inexpensively achieved.

Although specific embodiments of an improved thermal print head have been described for illustrative purposes, it will be readily appreciated by those skilled in the art that many additions, substitutions and modifications are possible without departing from the spirit or scope of the invention. For example, the conductive lines of the thermal print head may be oriented or arranged in any desired manner. It is understood that customary features of the print head, such as the flexible cable 43, protective shell 34, and hybrid chip microcircuit 32, are merely illustrative and are intended only to show the invention in one particular environment. The clear dielectric glass layer may be eliminated, and the wear bars of the invention may be applied directly over the conductive lines. It will be understood that other overglaze compositions may be used, producing a fired layer softer than the above-described smooth dielectric glass, and having a matte surface.

What is claimed as the invention is:

1. A thermal print head for use in thermal printing apparatus, said print head comprising:

a substrate;

a pattern of conductive lines on said substrate;

a resistive member overlying a portion of said lines, said lines adapted to generate discrete heated spots on said resistive member in response to excitation of said conductive lines; and a screen-printed protective coating over a portion of said pattern and adapted to reduce the abrasive effect of grit particles carried on a medium to be printed which is passed over said protective coating and resistive member, said coating comprising a layer of dried and fired material formed of a ceramic/glass overglaze composition mixed with fine metallic oxide particles, wherein said particles comprise zirconium oxide, said zirconium oxide constituting approximately 5 to 15 percent, by weight, of said overglaze composition/particle mixture.

2. A thermal print head according to claim 1, said coating having a height less than the height of said resistive member.

3. A thermal print head according to claim 2, said coating further comprising a second layer of smooth, hard dielectric glass between said conductive lines and said first-named layer, said second layer being harder than said layer.

4. A thermal print head according to claim 3, said first layer having a matte finish.

5. A thermal print head according to claim 1, said metallic oxide particles having sizes ranging from 0.5 to 2.0 microns.

6. A thermal print head according to claim 1, said layer, before drying and firing, having a viscosity of approximately 5,000 centipoise at 70° Fahrenheit.

7. A thermal print head according to claim 1, wherein the proportion of ceramic/glass overglaze composition to said particles is approximately 9:1, by weight.

8. A thermal print head according to claim 1, wherein said particles also comprise aluminum oxide, said aluminum oxide constituting approximately 10 to 0 percent, by weight, of said overglaze composition/particle mixture.

9. A protective coating for protecting electronic circuitry from abrasive particles carried on a tape passing over said circuitry in rubbing contact therewith, said protective coating being a mixture comprising, in a predetermined proportion, a fused ceramic/glass overglaze composition and fine metallic oxide particles, wherein said particles comprise zirconium oxide, said zirconium oxide constituting approximately 5 to 15 percent, by weight, of said overglaze composition/particle mixture, and wherein said coating, before fusing, has a viscosity of approximately 5,000 centipoise at 70° Fahrenheit, so as to be suitable for application by screen-printing.

10. A protective coating according to claim 9, said coating having a matte finish.

11. A protective coating according to claim 9, said metallic oxide particles having sizes ranging from 0.5 to 2.0 microns.

12. A protective coating according to claim 9 wherein the proportion of ceramic/glass overglaze compostiion to said particles is approximately 9:1, by weight.

13. A protective coating according to claim 9, wherein said particles also comprise aluminum oxide, said aluminum oxide constituting approximately 10 to 0 percent, by weight, of said overglaze composition/particle mixture.

* * * * *